United States Patent [19]

Schiller et al.

[11] Patent Number: 4,816,492

[45] Date of Patent: Mar. 28, 1989

[54] POLYMERIZED FOAMED OR REINFORCED TRANSLUCENT PANELS AND PROCESS FOR MAKING SAME

[76] Inventors: Rolf M. Schiller, 1396 Chartwell Drive; Jost H. Schiller, 1356 Camridge Road, both of West Vancouver, B. C., Canada

[21] Appl. No.: 52,715

[22] Filed: May 19, 1987

[51] Int. Cl.$^4$ .............................................. C08J 9/14
[52] U.S. Cl. ..................................... 521/88; 521/89; 521/117; 521/121; 521/145; 521/149
[58] Field of Search ................... 521/88, 89, 117, 121, 521/145, 149

[56] References Cited

U.S. PATENT DOCUMENTS

| | | |
|---|---|---|
| 3,170,808 | 2/1965 | Almy et al. |
| 3,301,930 | 1/1967 | Boggs |
| 3,860,371 | 1/1975 | Willy |
| 3,959,049 | 5/1976 | Tanaka |
| 4,005,958 | 2/1977 | Porter |
| 4,419,459 | 12/1983 | Melchior |
| 4,530,806 | 7/1985 | Melchior |

FOREIGN PATENT DOCUMENTS

| | | |
|---|---|---|
| 2934352 | 3/1980 | Fed. Rep. of Germany |
| 2935484 | 3/1980 | Fed. Rep. of Germany |

OTHER PUBLICATIONS

George E. Murray, the Dow Chemical Company, in a paper entitled "Insulated Daylight Glazing Panels", 20th Annual Technical Conf., Society of Plastics Engineers, Inc., vol. X, Jan. 27–30, 1964.

Primary Examiner—Morton Foelak
Attorney, Agent, or Firm—Seed and Berry

[57] ABSTRACT

This invention is directed to a novel translucent polymerized panel which can be used as is or be foamed or reinforced with glass fibre or other types of fibre, or reinforcing materials. These panels have good light transmitting, weathering and insulating qualities and do not yellow upon prolonged exposure to ultraviolet light. The invention is directed to a process of producing an acrylic product which is susceptible to foaming upon the application of heat, if a blowing agent is incorporated therein, or can be used with glass fibre reinforcement as a laminating panel. The process comprises: mixing an acrylate or methacrylate monomer, a vinyl monomer, vinyl acetate monomer, polyvinyl chloride monomer, or co-monomers thereof, a polymerization initiator, a molecular weight controlling agent, a catalyst and a metal substitute organic initiator, and polymerizing the mixture to produce a polymerized solid clear product. If required, a blowing agent may be incorporated in the mixture and the product can be reinforced with glass fibre.

34 Claims, 7 Drawing Sheets

POLYMERIZED FOAMED OR REINFORCED TRANSLUCENT PANELS AND PROCESS FOR MAKING SAME

FIELD OF THE INVENTION

This invention is directed to a novel translucent polymerized panel which can be used as is or be foamed or reinforced with glass fibres. The translucent panels or foams have good light transmitting, insulation and weathering qualities, and do not yellow upon prolonged exposure to ultraviolet light.

BACKGROUND OF THE INVENTION

Rigid foams made from various polymers such as polystyrene, polyethylene, polyurethane, polyvinyl chloride, and the like, have a number of good qualities such as strength, relatively low price, good insulation properties and the like. However, they also have a number of serious shortcomings. For example, some, such as polyurethane foam, are not translucent. Polystyrene foams rapidly yellow upon prolonged exposure to ultraviolet light. Polyester foams are not translucent and must usually be reinforced with some reinforcing component, such as fibreglass. Moreover, polyester foams also turn yellow over time, upon prolonged exposure to ultraviolet light.

Acrylic polymers, such as those made from acrylate and methacrylate monomers, or co-polymers thereof, have an advantage over most polymers because they have a strong resistance to yellowing upon prolonged exposure to ultraviolet light. Foams made from acrylic polymers however, are expensive and difficult to manufacture according to consistent standards. Rigid, clear acrylic foams can be blown with a suitable blowing agent such as a fluorocarbon. An advantage of using a blowing agent such as a fluorocarbon is that the insulation qualities of the acrylic foam can be increased relative to foams which are blown with other non-condensing blowing agents.

Acrylic panels or foams can be used alone or can be sandwiched between panes of glass, or other suitable light transmitting materials, in order to provide attractive roofing, ceiling, wall, partition mediums or decorative panels. Acrylic panels or foams can also be reinforced with minute reinforcing elements such as fibreglass without detracting substantially from the translucency qualities of the panel or foam.

The applicant is aware of the following references which are more or less pertinent to the subject matter of this invention:

| U.S. Pat. No. | Inventor | Issue Date |
| --- | --- | --- |
| 3,170,808 | Almy et al. | Feb. 23, 1965 |
| 3,301,930 | Boggs | Jan. 31, 1967 |
| 3,860,371 | Willy | Jan. 14, 1975 |
| 3,959,049 | Tanaka et al. | May 25, 1976 |
| 4,005,958 | Porter | Feb. 1, 1977 |
| 4,419,459 | Melchior | Dec. 6, 1983 |
| 4,530,806 | Melchior | July 23, 1985 |

| German Patent Number | Owner | Issue Date |
| --- | --- | --- |
| DE2934352 | Sumitomo Chemical | Mar. 13, 1980 |
| DE2935484 | Mitsui Toatsn Chemicals | Mar. 20, 1980 |

George E. Murray, the Dow Chemical Company, in a paper entitled "Insulated Daylight Glazing Panels", delivered at the 20th Annual Technical Conference of the Society of Plastics Engineers, Inc., Vol. X, Jan. 27–Jan. 30, 1964, disclosed large celled methyl methacrylate copolymer plastic foam but no details of manufacturing techniques or formulations were given.

U.S. Pat. No. 4,530,806, Melchior, discloses a process of making articles of foamed polymethyl methacrylate comprising a monomeric methyl methacrylate, a plasticizer which in reality is merely another type of methacyrlate, a foaming agent, and a polymerization catalyst. The polymerization step is conducted under pressures in excess of the evaporation pressure of the foaming agent. Subsequently, the polymerized material is subjected to temperatures in excess of the evaporation temperature of the foaming agent, whereby the product is formed.

There does not appear to be any disclosure in Melchior of foaming at ambient pressures or the use of a metal initiator which permits themethacrylate to be polymerized and foamed without the use of pressure for controlling the process. Also, Melchior does not disclose use of a dual mixture feed system whereby catalyst is present in one of the feed mixtures and the metal initiator is present in the other mixture. Further, Melchior does not mention the use of polymer chain length controlling agents to promote short chains in the polymer and consequent cell size, translucency and uniform cell size. Finally, Melchior does not disclose a process of making a methylmethacrylate prepolymer copolymerized with vinyl-monomers, vinyl acetate, or polyvinylchloride.

Boggs demonstrates a process of producing fibre reinforced resin articles whereby a resin coating is applied to a carrier, which in turn is transferred to webs during contact therewith. This process produces a finished product which has a fibre-free surface.

Tanaka discloses a process for the production of artificial leathers whereby polyurethane prepolymer is foamed between a water-vapour permeable substrate, and a release medium. The foam becomes permanently bonded to the water vapour permeable substrate.

German Pat. Nos. DE2934352 and DE2935484 mention the manufacture of glass reinforced panels. They disclose the copolymerization of acrylic monomers and styrene monomers and indicate that this combination changes the refraction index of the resin. These products can purportedly be used with several types of glass fibre to obtain a transparent panel with minimum visibility of the glass fibres.

SUMMARY OF THE INVENTION

The invention is directed to a process of producing an acrylic product which is susceptible to foaming upon the application of heat comprising: mixing a monomer selected from the group consisting of an acrylate, a methacrylate, a vinyl monomer, a vinyl acetate monomer, a polyvinyl chloride monomer, or co-monomers thereof, a polymerization initiator, a blowing agent, a molecular weight controlling agent and a catalyst, and polymerizing the mixture to produce a polymerized product.

The invention also is directed to a process of preparing a foamable acrylic polymer or co-polymer comprising: (a) preparing a prepolymer by mixing the following ingredients: an acrylate, methacrylate or a vinyl monomer, either alone or in combination, a polymerization initiator, and a suitable molecular weight controlling agent, and mixing and heating this mixture at temperature above room temperature for at least 15 minutes, thereafter cooling the mixture to room temperature; (b) adding to the cooled mixture a blowing agent; (c) dividing the mixture, including the blowing agent, into two parts and to the first part incorporating therein a suitable amount of catalyst, and to the second part incorporating therein a suitable amount of a polymerization initiator; and (d) mixing the two parts together to enable the two parts to polymerize to produce a polymerized product.

In the process, the acrylate, methacrylate or vinyl monomers may be selected from the group consisting of: methyl methacrylate, n-butylmethacrylate, n-hexylmethacrylate, n-butylacrylate, 2-ethylhexylacrylate, 2-ethylhexylmethacrylate, vinyl acetate, vinyl chloride, ethyleneglycol-dimethacrylate, triethyleneglycoldimethacrylate, and trimethylolpropane trimethacrylate.

The blowing agent may be selected from the group consisting of: trichlorofluoromethane, trichlorotrifluoroethane, trichlorofluoroethane, pentane, trichlorofluoromethane combined with diocytylphthalate, trichlorofluoromethane combined with dibutylphthalate and trichlorofluoromethane combined with dimethylphthalate.

The molecular weight controlling agent may be selected from the group consisting of diethylene-disulfide, dibutyl-disulfide, dicyclohexyl-disulfide, t-dodecyl-mercaptan, n-dodecyl-mercaptan, thioglycolacid ester, methyl ethylene glycol.

The polymerization initiator may be selected from the group consisting of a zinc, cadmium, cobalt, copper or iron substituted organic substance or may be selected from the group consisting of zinc thioglycol, cadmium thioglycol, copper naphthenate, iron naphthenate, and cobalt naphthenate.

The catalyst may be selected from the group consisting of lauryl peroxide, benzoyl peroxide, hydroperoxide, alkyl-peroxide, dibenzoyl peroxide, dilauryl peroxide, t-butyl peroctoate, perbenzoate, perpivalate, permaleinate azo-bis-isobutyl acetate, azo-bis-isobutyl nitrile, butyl permalmate peroxide, t-butyl hydroperoxide modified with maleic anhydride, alkyd sulfhydride ester, methyl ethylene glycol thio acid ester, ethylene glycol thio acid ester and butyleneglycol thio acid ester, and amine compounds such as dimethyl para-toluidine, di-iso propanol para-toluidine and dioxy ethyl para-toluidine.

In the process, the acrylate may be methylmethacrylate, the chain control agent may be a methylene glycol thio acid ester, the blowing agent may be trichlorofluoromethane, the polymerization initiator may be zinc thioglycol and the catalyst may be lauryl peroxide.

In the process, the acrylate resin may comprise a mixture of methylmethacrylate and n-hexylmethacrylate. Colour pigments, dyes, fillers and flame retardants can be added. Fillers may be silicates, carbonates, talc, quartz, ground glass, aluminum trihydrate. Flame retardants can be polypenta bromo benzyl acrylate, antimony dioxide or aluminum trihydroxide In the process, the product may be subsequently heated to a temperature of above at least about 120° C. for sufficient time to provide a foamed product The foam sheet may be dispersed between two parallel converging non-adhesive continuously moving sheets to produce a foamed product therebetween.

DRAWINGS

In the drawings, which illustrate only specific embodiments of the invention, and are not to be construed as limiting the scope of the invention.

DETAILED DESCRIPTION OF CERTAIN EMBODIMENTS OF THE INVENTION

Figure 1:
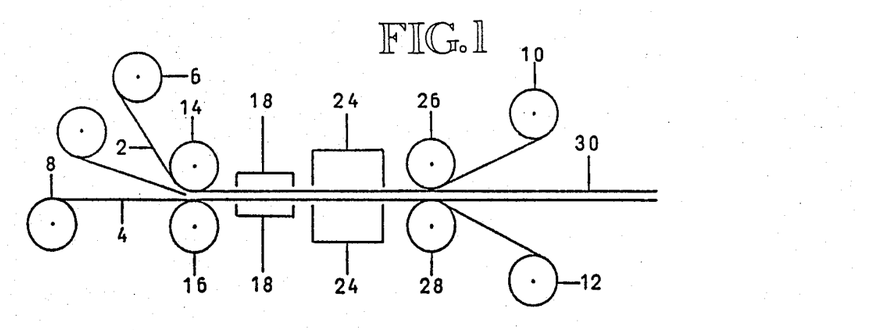
FIG. 1 represents a side elevation view of a process flow sheet which is used to manufacture acrylic or acrylic-fibreglass sheet and subsequently acrylic or acrylic-fibreglass foamed sheet.

Referring to FIG. 1, the basic process of the invention involves the use of a pair of carrier sheets 2 and 4 which are unwound from respective supply rolls 6 and 8 and are taken up at the end of the process run by a pair of take-up rolls 10 and 12. The carrier sheets 2 and 4 are non-adhesive in nature and are utilized to sandwich an unpolymerized acrylic or acrylic fibreglass mixture 5 and convey it through an initial pair of primary calender rolls 14 and 16, through a cooling area 18, a curing oven 24 and subsequent secondary calender rolls 26 and 28 in order to produce an acrylic or acrylic-fibreglass sheet product 30. The pair of carrier sheets 2 and 4 are utilized for the purpose of preventing the arylic resin or acrylic fibreglass mixture from adhering to the primary calendar rolls 14 and 16, to convey the polymerizing mixture through the process, and to assist in processing the finished sheet so that it has uniform thickness. As can be seen from FIG. 1, the pair of carrier sheets 2 and 4 are peeled away from the polymerized acrylic or acrylic-fiberglass sheet once the polymerized material has passed through the secondary calendar rolls 26 and 28. When fibreglass fibres are used, the fibreglass fibres are dispersed throughout the acrylic sheet in a random manner and reinforce the final sheet product. The acrylic monomer is polymerized and cured by means of suitable catalysts, heat, and the like.

A problem with fibreglass sheet which is produced by this process is that some of the fibreglass fibres are located at the surface of the sheet because of the random dispersion of the fibreglass fibres in the initial unpolymerized mixture 5. The surface fibres provide locations of inconsistency which are vulnerable to weathering and ultimately can lead to deterioration of the surface of the sheet. Dirt, smoke, rain, and the like, penetrate into the minor spaces which exist between the fibres and the resin on the surface of the sheet, thereby leading to breakdown of the surface of the sheet.

Figure 2:
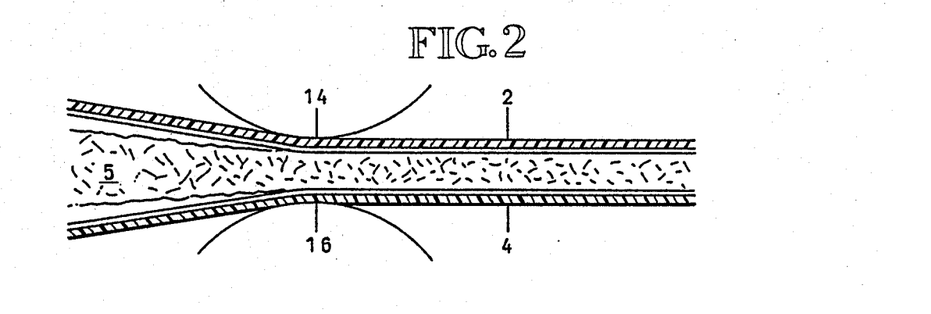
FIG. 2 represents an enlarged side sectional view of the primary calender roll region of the process of FIG. 1 and the manner in which a pre-cured acrylic coating which is carried between the internal surfaces of two converging carrier sheets is utilized to coat the external surfaces of an acrylic fibreglass reinforced acrylic sheet.

In order to provide a more weather resistant, longer lasting sheet, an improved process is used whereby a prepolymer acrylic coating is applied to the respective interior surfaces of the two converging carrier sheets 2 and 4, before they encounter and are compressed with the main acrylic-fibreglass material by calender rolls 14 and 16. This variation is illustrated in FIG. 2 which, in effect, represents a side-section enlargement of the area of the process immediately preceding the primary calendar rolls 14 and 16. The acrylic coating, which is applied to each of interior surfaces of the two carrier sheets 2 and 4, does not contain any fibreglass material and accordingly, as the combination of the acrylic fibreglass mixture with acrylic polymer sandwiching each side proceeds through the overall process, and the final acrylic-fibreglass sheet has on each side thereof a thin layer of pure acrylic coating after the pair of carrier sheets are peeled away from the main product at the end of the process. This acrylic coated acrylic-fibreglass sheet has much greater weather resistance than a fibreglass sheet which is manufactured according to the first decribed process. A variation of the acrylic resin coated process described above can be made if only one surface of the sheet is to be exposed to the elements In such a case, only one of the carrier sheets is coated with the acrylic polymer and thus only one side, that is the exterior side, carries the acrylic coating. The underside of such a sheet, which is not exposed to weather, need not have a protective layer of acrylic coating and thus fibreglass fibres will be present on the unexposed surface. The acrylic resin can also be heavily filled up to about 90 percent wt. with powder or stone to produce decorative panels or countertop materials.

Figure 3:
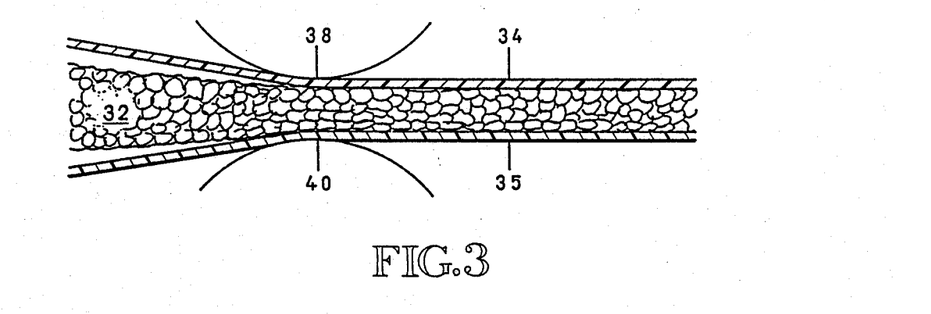
FIG. 3 represents an enlarged side-sectional view of the manner in which a foamed cellular acrylic product is dispersed between two non-adhesive converging carrier sheets to provide a foamed product of uniform width.
Figure 4:
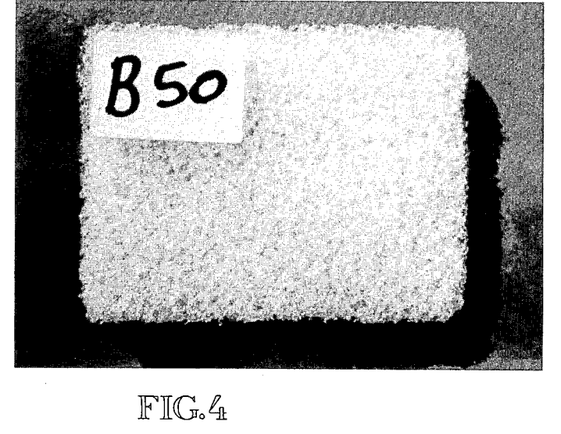
FIGS. 4 through 14 illustrate photocopies of samples B-50, B-51, B-52, B-53, B-55 (two runs), B-57 (two runs), B-58 and B-59 (two runs) as produced according to the invention.
Figure 5:
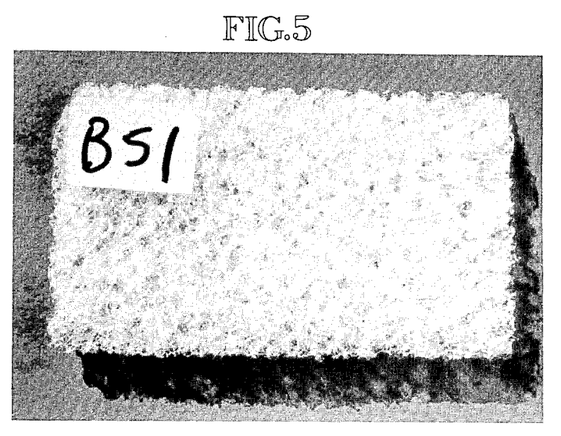
Figure 6:
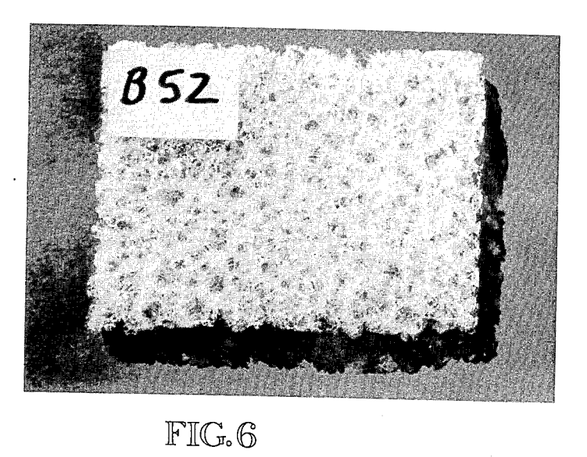
Figure 7:
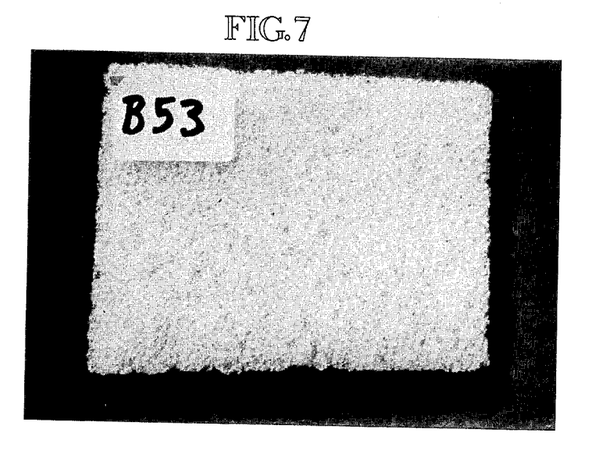
Figure 8:
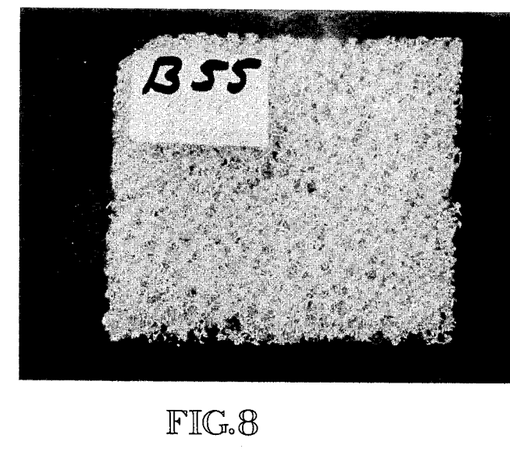
Figure 9:
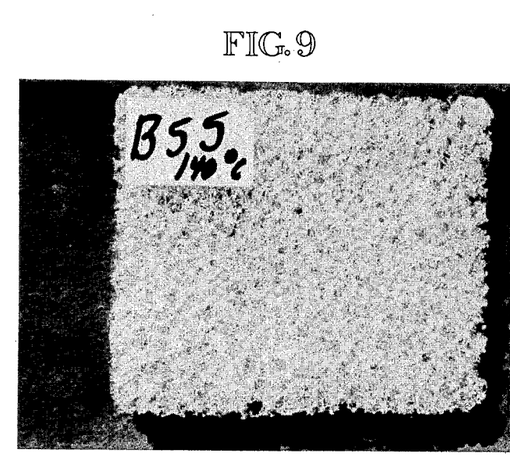
Figure 10:
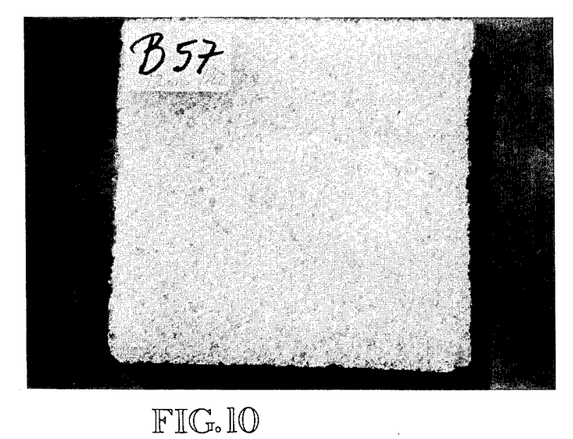
Figure 11:
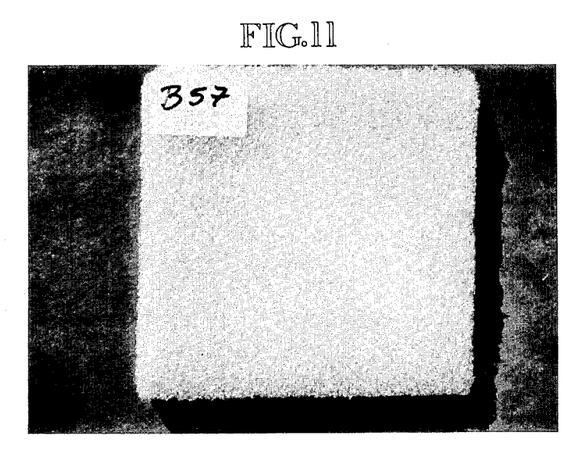
Figure 12:
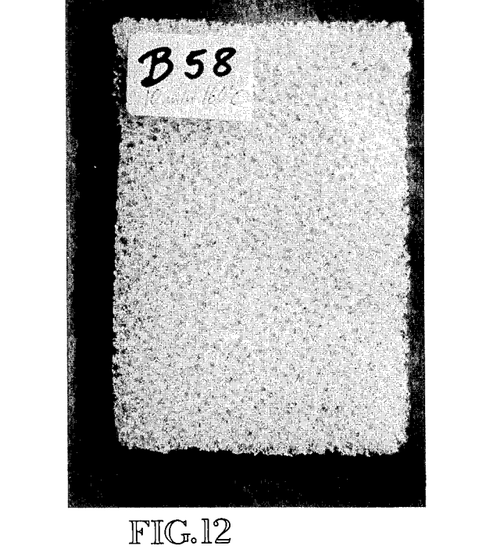
Figure 13:
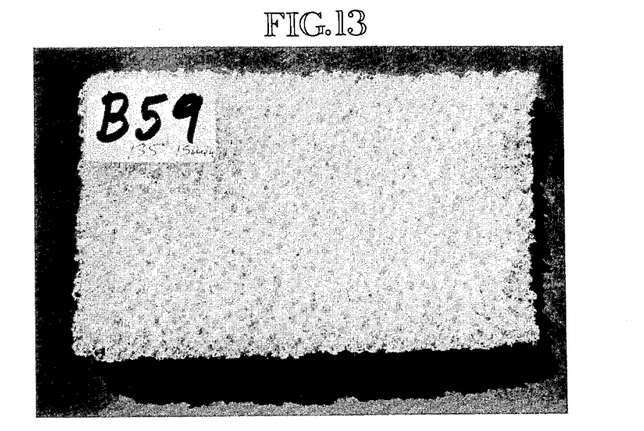
Figure 14:
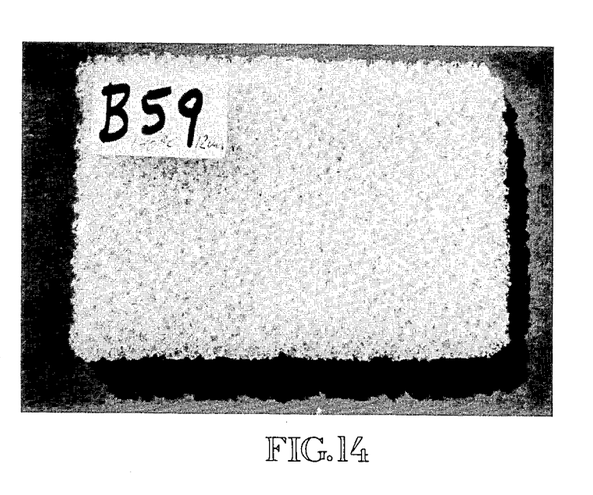

The basic process as outlined initially can also be used to manufacture an acrylic sheet which can be foamed on the application of controlled heat. This is done by using a blowing agent, such as a fluorocarbon, which is incorporated in the initial unpolymerized acrylic product recipe. The blowing agent, when incorporated in the acrylic substrate remains inactive until the polymerized acrylic sheet is subjected to controlled heat. Upon the application of controlled heat, the blowing agent volatilizes internally in the sheet to form a multitude of discrete gas bubbles which in effect form the multitude of cells which make up the final foamed acrylic sheet. The acrylic resin is in a softened elastic condition when the blowing process takes place. Referring to FIG. 3, the thickness of the final foamed acrylic sheet 32 can be governed by passing the sheet product as it is being foamed between two non-adhering carrier sheets 34 and 35, similar to those used in the process originally described, and controlling the distance between the calender rolls 38 and 40 on either side of the carrier sheets 34 and 35.

In addition to the foregoing process, we have discovered that the cell structure of the foamed acrylate and methacrylate polymers can be regulated in part by controlling the degree and extensiveness of the dispersion of the blowing agent in the polymer. Our tests indicated that the dispersion of the blowing agent can be controlled in part by the molecular weight of the monomer or monomer mixture which is to be polymerized. While we do not with to be adversely bound by any theories, the following comments are provided to possibly assist in understanding of the invention. Generally speaking, a higher molecular weight monomer appears to provide a stronger, more resilient product which can be blown to a greater extent, thereby producing a foam which has large cell structure. The dispersion can also be modified by adding different monomers with different viscosities, for example, vinyl acetate, vinyl chloride or phthalate monomers.

On the other hand, a more rigid foam can be produced by using appropriate cross-linking agents. Such foams, probably due to the larger amount of crosslinking, tend to be more rigid and less elastic, and generally speaking, are more difficult to blow into a foam structure which has anything larger than a small cell structure.

In our process, we have been successful in manufacturing a transparent acrylic or methacrylic resin block or sheet, which contains therein a well-dispersed blowing agent. The block or sheet can be subsequently blown at any time or place into a foam upon the controlled application of an appropriate amount of heat to the block or sheet. This technique reduces shipping costs because a more compact product is being shipped.

We have also discovered that a Group IB or IIB metal substituted organic compound such as zinc has an enhancing effect on the even dispersion of the blowing agent and enables more even consistent size cells to be obtained. Indeed, we have determined that zinc, together with an appropriate catalyst, can cause blowing and that a separate blowing agent is not required. We have found that such a foamed product tends to have small, evenly distributed cells, and is particularly amenable for use in association with reinforcing agents such as short fibreglass fibres which are evenly dispersed throughout the sheet.

It is also possible, we have found, to make sandwich type structures from a combination of the products that we have been able to produce, for example, fibreglass reinforced exterior acrylic or methacrylic sheets may enclose an internal foamed acrylic or methacrylic product, or an alternative combination can be used. Also, multiple layered structures can be constructed.

Another discovery that we have made is that by using different types of initiators, such as peroxides, it is possible to control the size and consistency of the cells which appear in the foam and thereby produce a cellular product which has consistent evenly dispersed cells throughout the structure. Furthermore, by using metal containing initiators, we have found that it is not necessary to use pressures in order to produce a methacyrlic or acrylic sheet incorporating blowing agent of consistent dimensions. Techniques taught in the art utilize considerable pressure.

A typical basic formula for producing an unfoamed methacrylic product, according to our invention, would be as follows:
 (a) methacrylate monomer,
 (b) catalyst, and
 (c) metal initiator.

Short, small diameter fibreglass reinforcing substances can be included in this formulation if it is desired to obtain a reinforced unfoamed product. To provide a variation in product qualities, the methacrylate can be replaced in whole or in part by other methacrylates or acrylate monomers, or other non-related monomers such as vinyl acetate or vinyl chloride.

If it is desired to obtain a product which can be foamed, either on stream during the manufacturing process, or subsequently at some other time or location, the following formulation can be used:
 (a) methacrylate monomer,
 (b) fluorocarbon foaming agent,
 (c) polymerization and blowing catalyst, and
 (d) metal initiator.

As a general rule, cobalt, zinc, cadmium, copper or iron substituted organic substances such as zinc thioglycol, cadmium thioglycol, copper naphthenate, iron naphthenate or cobalt naphthenate constitute suitable metal initiators. We have found, in particular, that a zinc compound is useful in enhancing the blowing ability of the blowing agent, and enables the cell size of the foamed product to be controlled within narrow tolerances. The metal initiator permits the process to operate at greater speeds without the application of pressure and tends to enable lower temperatures to be used, which is an advantage.

Suitable catalysts can be lauryl peroxide, benzoyl peroxide, hydroperoxides, alykl-peroxides, dibenzoyl peroxides, dilauryl peroxides, t-butyl peroctoate, perbenzoate, perpivalate, permaleinate azobis-isobutyl acetate, azo-bis-isobutyl nitrile, or butyl permalmate peroxide. Methyl methacrylate has a boiling point of 100.3° C., ethyl methacrylate has a boiling point of 118.8° C., and n-butyl methacrylate has a boiling point of 163.5° C. On the other hand, a typical blowing agent, for example, trichlorofluoromethane, evaporates at 28° C. But it does not typically commence to blow the polymer until temperatures of about 60° C. are reached.

In a conventional blowing process, once temperatures of 50° to 60° C. are reached, in times of 25 or more minutes, the blowing process tends to proceed in a somewhat unpredictable and erratic manner and quality control of the finished process is difficult. We have found that utilizing mixtures of methacyrlates having different boiling points provides a means of controlling blowing temperatures and different dispersion distribution to control cell size.

We have also developed a dual component resin mixing system as part of our process. One component can comprise the methacrylate resin, or mixtures thereof, in combination with blowing agent and catalyst. The other component can comprise methacylate resins or mixtures thereof, blowing agent, and metal initiator. The two components are then combined and mixed to provide a combination which we have discovered can be readily controlled, provides high quality consistency, and a great degree of predictability to the process.

As a general rule, the shorter chain polymers flow more readily because they are less viscous, while the longer chain polymers flow less readily because they are more viscous. We have determined that since short chain polymers tend to provide foams with larger cellular structure, while the long chain polymers provide foams with smaller cellular structure, the use of mercaptan disulfide which promotes short chain polymers, is a useful tool in preparing foams with larger cellular structures.

EXAMPLE 1

A composition was prepared according to the following formulation:
140 g methyl methacrylate
6 g 60/40 vinyl acetate vinyl chloride
0.5 g methyl ethyleneglycol thio acid ester
0.4 g benzoyl peroxide
44 g trichlorofluoromethane
1.2 g permaleinate peroxide
1.2 g zinc thioglycol The methacrylate resin, the blowing agent, and the catalyst were mixed as one component. Further methacrylate resin, blowing agent and the metal initiator were mixed together as a second component. The components were then blended at 20° C. Upon mixing, the mixture commenced to polymerize without requiring the application of pressure and continued to polymerize for a period of about 45 minutes. During the polymerization phase, the temperature of the polymerizing mixture rose from about 20° C. to about 30° to 45° C. This recipe produced a hard transparent sheet of uniform quality.

The temperature of the product was subsequently raised to about 120° C., whereupon it began to foam. The product as it was foamed was carried on a non-adhesive belt for about 15 minutes. The foamed product, which was subsequently cooled, and then dispatched to cutters.

EXAMPLE 2

A variation on the formulation utilized in Example 1 was conducted. The formulation was the same as re-cited in Example 1 except that the formulation included a large number of short fibreglass filaments as a reinforcing component and no blowing agent. In conducting this experiment, it was determined that it was important to control the chain length of the resin, even in its unfoamed form, so that short chain lengths were achieved. A less viscous product is desirable because, as was determined, the product tended to wet the fibreglass better, thereby ensuring better bonding between the polymer and the fibreglass reinforcing filament.

EXAMPLE 3

The following process using species from each generic ingredient designated was used to produce light translucent foamed panels and articles in a variety of shapes and densities, using a mixture of methacrylates, methylmethacrylates and acrylate monomers as the resin. These panels could be shaped, laminated, corrugated, or used on their own, or.in combination with translucent plastic sheets, as a sandwich construction or between glass panes.

The basic composition and process followed was as follows:

Composition (a) A mixture of acrylic monomers;
(b) A molecular weight (polymer chain length) control compound. Such a compound does not interfere with the normal course of polymerization. It merely provides for short chain links in the polymerized methacrylate or acrylate monomer or co-monomers, to permit ready intermolecular flow when heated in the blowing stage. Flowability provides for good translucency and permits larger closed cells to be formed in a uniform pattern.
(c) At least one polymerization catalyst,
(d) A blowing agent,
(e) A second catalyst, and
(f) A metal substance.

The use of the metal substance has a trifold action: (1) it enhances blowing action; (2) it contributes to uniform dispersion of the blowing agent throughout the mixture and provides for a consistent blowing pattern; (3) it acts as a catalyst activator to permit rapid, controlled polymerization of the acrylic monomer mixture at room temperature without having to use heat or pressure to prevent premature decomposition or volatilization of the blowing agent during the first stages of polymerization.

The composition outlined above, which can be regarded as a prepolymer, is further mixed with other components as follows:

100 g prepolymer,
1.5 g cross-linking component,
0.4 g peroxide,
0.2 g zinc compound.

This mixture is poured on a cellophane sheet and after being distributed evenly, a fibreglass mat or chopped fibreglass filaments is laid onto the resin mixture. After a few minutes, the fibreglass mat or chopped strands are completely covered. A second sheet of cellophane is then laid over the mixture to cover the resin and the fibreglass. This sandwich structure is kept at about 30° to 35° C. for about 30 minutes without application of any pressure. After polymerization has been completed, it is introduced into an oven at approximately 100° C. After 20 minutes, a finished acrylic reinforced sheet with fibreglass is obtained.

Different types of glass fibres can be used. Type E has a refraction index which is different from acrylic resin and hence has been found to be plainly visible through the panel. On the other hand, glass fibre types C and A have a refraction index which is very similar to acrylic resin. We have found that they provide translucent panels where the glass fibres are not very visible.

EXAMPLE 4

A procedure generally in accord with the broad procedure in Example 3 was followed with the specific ingredients designated.

Formulation 140 g methylmethacrylate
13 g n-hexylmethacrylate
0.5 g alkyd sulfhydride ester
0.4 g lauryl peroxide
44 g trichlorfluoromethane
1.2 g t-butyl-hydroperoxide modified with maleic anhydride
1.2 g zinc thioglycol This formulation yielded a foamed panel with good translucency even closed cell structure. The cells were of approximately 4 mm size.

EXAMPLE 5

A procedure generally the same as in Example 4 was followed.

Formulation 140 g methylmethacrylate
0.5 g ethylene glycol thio acid ester
0.4 g benzoyl peroxide
44 g trichlorfluoromethane
1.2 g t-butyl-hydroxperoxide modified with maleic anhydride
1.2 g zinc thioglycol This recipe provided a foamed panel with good translucent properties. Closed cells of a size of approximately 3 mm with low density were produced.

EXAMPLE 6

A procedure generally the same as in Example 3 was followed.

Formulation 140 g methylmethacrylate
0.5 g methylene glycol thio acid ester
0.6 g lauryl peroxide
1.2 g t-butyl-hydroperoxide
1.5 g zinc thioglycol A foamed panel with good translucency with closed cell size of approximately 2 mm, at a slightly higher temperature, with a higher density, was obtained.

EXAMPLE 7

A procedure generally the same as in Example 3 was followed.

Formulation 140 g methylmethacrylate
6 g butyl acrylate
0.5 g butyl glycol thio acid ester
0.4 g lauryl peroxide
44 g trichlorofluormethane
1.2 g t-butyl-hydroperbxide modified with maleic acid
1.2 g zinc thioglycol This formulation yielded a foamed panel with good translucency properties and an evenly dispersed closed cell size of approximately 4 to 5 mm.

EXAMPLE 8

A procedure generally the same as in Example 3 was followed.

Formulation 140 g methylmethacrylate
0.4 g lauryl peroxide
44 g trichlorofluormethane
1.2 g t-butyl hydroperoxide modified with maleic acid
1.2 g zinc thioglycol A foamed panel with very small closed cells and little translucency was produced.

EXAMPLE 9

This example was conducted to demonstrate how molecular weight change affected translucency and uniformity and size of closed cells. The foamed product was identified as B-53.

Sample B-53

60 g methylmethacrylate
0.8 g lauryl peroxide

These components were mixed and heated at 85° C. for 35 minutes to produce a first prepolymerization mixture.

In a second stage:

44 g trifluorochloromethane
1.3 g permaleinate peroxide
12 g zinc thioglycol were mixed into the first batch and polymerized at room temperature without pressure for approximately 45 minutes.

As a third stage, the temperature was raised gradually to about 130° C. and held there for 15 minutes. The resulting product had a milky quality with uneven small cells of the order of 1 to 1.5 mm size.

EXAMPLE 10

The same conditions and procedures as in sample B-53 (Example 9) were followed except in the first stage of prepolymerization a molecular weight control agent, methyl ethylene glycol thio acid ester, was included.

160 g methylmethacrylate
0.5 g methyl ethyleneglycol thio acid ester
0.8 g lauryl peroxide This single change yielded a foamed product which had larger translucent cells (2 to 3 mm) with a uniform pattern. This product was three times more translucent than sample B-53.

Variations on the basic process outlined above can be conducted using the following ingredients and components:

Cross-linking Agent 1. ethyleneglycol-dimethacrylate
2. triethyleneglycol-dimethacrylate
3. trimethylolpropane trimethacrylate

Blowing Agent

1. Trichlorofluoromethane
2. Trichlorofluoroethane
3. Trichlorofluormethane
   (a) combined with diocytylphthalate
   (b) combined with dibutylphthalate
   (c) combined with dimethylphthalate

Monomers

Methacrylate monomers:
1. Methylmethacrylate
2. n-Butylmethacrylate
3. n-Hexylmethacrylate
4. n-Butylacrylate
5. 2-Ethylhexylacrylate
6. 2-Ethylhexylmethacrylate
7. Vinyl monomer
8. Vinyl acetate
9. Vinyl chloride

EXAMPLE 11

This example illustrates a method according to the invention of producing translucent acrylic-glass fibre, reinforced panels and articles, using a mixture of methacrylic and acrylate monomers. The following process was used to produce a light translucent panel composed of a co-polymer mixture of methacrylates, methylmethacrylates and acrylates.

During the process of polymerization, short glass fibre filaments were incorporated to provide a finished polymerized solid product with the glass reinforcement embedded in the polymer.

Generic Composition (A)

(a) Acrylic monomers and co-polymers;
(b) A catalyst mixture specifically selected to provide activity at specified temperatures and having a sensitivity to special activators;
(c) a cross-linking component;
(d) a molecular weight control component which yields short chain length polymerization and thereby provides proper conditions for the catalyst mixture to produce polymerization at a rate which permits the continuous or noncontinuous fabrication of acrylic glass fibre reinforced panels.

Alternative Generic Catalyst Mixtures (B)

1. A catalyst selected to have action temperature of 40°-60° C.;
2. A catalyst selected to have an action temperature of 60°-90° C.;
3. A catalyst which promotes a reaction at room temperature in the presence of a metal initiator.

GENERIC PROCESS: TWO STAGES

Composition—First Stage 99 g methylmethacrylate
1 g n-butylmethacrylate
0.3 g methylethyleneglycol thio acid ester
0.01 g t butylhydroperoxide This combination is mixed and heated to 85° C. in an appropriate reactor for 30 minutes. It is then cooled to room temperature. A clear resin with a honey consistency is obtained.

The second and third stages are followed according to the procedure in Example 3.

An alternative co-polymer mixture for the 99 g methylmethacrylate would be to substitute 60 g methylmethacrylate and 39 g methylacrylate. The methacrylate monomer has been found to add flexibility.

EXAMPLE 12

A number of varieties of rigid foamed acrylic product produced according to the procedures discussed herein are illustrated in the drawings. The characteristics and formulations of these products are summarized below in semi-tabular form:

Sample B-50

This sample was produced utilizing methymethalcrylate, a trichlorofluormethane blowing agent, and zinc thioglycol. A highly translucent, foamed article having cells of inconsistent size, measuring approximately 0.1 to 0.3 cm was produced.

Sample B-51

The formulation for this product was essentially the same as that for Sample B-50 above, except that a chain length controlling agent was used. As seen in the drawings, this product had a highly translucent quality, but large consistent size cells were obtained. The largest cells were of 0.5 to 0.7 cm diameter.

Sample B-52

The formulation for this product included methylmethacrylate, trichlorofluormethane and 3 g dimethylphalate. A zinc thioglycol metal initiator was used. In this case, a highly translucent product was obtained, and larger cells were obtained. Some of the larger size cells measured 0.7 to 0.9 cm in diameter.

Sample B-55

The formulation which produced this sample included methylmethacrylate, trichlorofluormethane, 1.5% dimethylphthalate and a cadmium thioglycol initiator. The sample produced had a highly translucent quality and cells of well dispersed and consistent size, the larger cells measuring 0.3 to 0.4 cm in diameter. A first run to produce the B-55 product was foamed at 135° C. for about 20 minutes. A second run was foamed at about 140° C. for about 15 minutes. The respective products obtained were relatively similar. However, the cell size for the second run tended to be somewhat larger, thereby resulting in a product which was more translucent than the first run product.

Sample B-57

This product was produced using methylmethacrylate, trichlorofluormethane, 1.25 g dimethylpthalate, benzoyl peroxide and a zinc initiator. Two runs were made. One run was foamed at about 120° C. for 12 minutes, the second run was foamed at about 135° C. for 20 minutes. This formulation produced a product which tended to have a somewhat shiny surface quality. Cell size tended to be quite fine, that is, about 0.1 to 0.2 cm diameter for the larger cells. The cell size for the second run tended to be somewhat larger, some of the larger cells measuring 0.3 cm diameter. The samples had a somewhat milky quality, rather than a desirable clear translucent quality.

Sample B-59

Two runs were made. The formulation used to prepare the products from these two runs comprised methylmethacrylate, trichlorofluormethane, 1.25 g benzoyl peroxide, 1.25 g dimethylphthalate and a zinc thioglycol initiator. The first run was foamed at a temperature of about 1.35° C. for 15 minutes. The second run was foamed at about 140° C. for about 12 minutes. A product with relatively small cell size was obtained in both cases. Indeed, the cell size between the two runs was remarkably consistent. Some of the larger cells in both cases measured 0.2 to 0.3 cm diameter. Each product had a clear translucent quality with minimum milkiness.

Melchior, in U.S. Pat. No. 4,530,806, granted July 23, 1985, appears to be of the view that in order to obtain acrylic foams having reasonably large cells, it is necessary to use a co-polymer. However, as the foam samples discussed above indicate, it is not necessary to use a co-polymer when utilizing the process of the invention. In each instance, methylmethacrylate alone was used, and yet in certain instances, large cell products were obtained. Melchior also seems to be of the view that acrylates and butylacrylates can be used to produce large closed cells. We have discovered, however, that cell size can be controlled by chain length and different types of initiators rather than by only polymer mixtures. The use of a metal initiator, and chain length controlling agents, we have found, are more important than the selection of the basic resins in the overall control of the quality, consistency, and size of the cell in the foam. It is also important, we have found, that the dispersion of the blowing agent is even throughout the mixture. Such even dispersion, we have determined, is controlled by use of one or more chain length controlling agents. A higher density mixture, we have learned, produces a different blowing agent dispersion than does a lower density mixture. In general, we have found that the lower the density, the less the dispersion. In the high density mixture, the blowing agent tends to be mixed in the resin in droplet form, thereby resulting in larger cell size.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

We claim:

1. A process of producing an acrylic product which is susceptible to foaming upon the application of heat comprising:

mixing a vinyl monomer selected from the group consisting of an acrylate, a methacrylate, a vinyl acetate, a chloride, or co-monomers thereof, a polymerization initiator, a blowing agent, a molecular weight controlling agent elected from the group consisting of diethylene-disulfide, dibutyl-disulfide, dicyclohexyl-disulfide, t-dodecyl-mercaptan, n-dodecyl-mercaptan, thioglycol-acid ester, and methyl ethylene glycol, and a catalyst, and polymerizing the mixture to produce a polymerized product.

2. A process as defined in claim 1 wherein the vinyl monomers are selected from the group consisting of: methyl methacrylate, n-butylmethacrylate, n-hexylmethacrylate, n-butylacrylate, 2-ethylhexylacrylate, 2-ethylhexylmethacrylate, ethyleneglycol-dimethacrylate, triethyleneglycol-dimethacrylate, and trimethylolpropane trimethacrylate.

3. A process as defined in claim 1 wherein the blowing agent is selected from the group consisting of: trichlorofluoromethane, trichlorotrifluoroethane, trichlorofluoroethane, pentane, trichlorofluoromethane combined with diocytylphthalate, trichlorofluoromethane combined with dibutylphthalate and trichlorofluoromethane combined with dimethylphthalate.

4. A process as defined in claim 1 wherein the polymerization initiator is selected from the group consisting of a zinc, cadmium, cobalt, copper or iron substituted organic substance.

5. A process as defined in claim 1 wherein the polymerization initiator is selected from the group consisting of zinc thioglycol, cadmium thioglycol, copper naphthenate, iron naphthenate, and cobalt naphthenate.

6. A process as defined in claim 1 wherein the catalyst is selected from the group consisting of lauryl peroxide, benzoyl peroxide, hydroperoxide, alkylperoxide, dibenzoyl peroxide, dilauryl peroxide, t-butyl peroctoate, perbenzoate, perpivalate, permaleinate azo-bis-isobutyl acetate, azo-bis-isobutyl nitrile, butyl permalmate peroxide, t-butyl hydroperoxide modified with maleic anhydride, alkyd sulfhydride ester, methyl ethylene glycol thio acid ester, ethylene glycol thio acid ester and butyleneglycol thio acid ester.

7. A process according to claim 1 wherein the vinyl monomer is methylmethacrylate.

8. A process according to claim 7 wherein the chain control agent is a methylene glycol thio acid ester.

9. A process according to claim 8 wherein the blowing agent is trichlorofluoromethane.

10. A process according to claim 9 wherein the polymerization initiator is zinc thioglycol.

11. A process according to claim 1 wherein the acrylate resin comprises a mixture of methylmethacrylate and n-hexylmethacrylate.

12. A process according to claim 11 wherein the catalyst is lauryl peroxide.

13. A process according to claim 1 wherein the product is subsequently heated to a temperature of above at least about 120° C. for sufficient time to provide a foamed product.

14. A process of preparing a foamable acrylic polymer or co-polymer comprising:

(A) preparing a prepolymer by mixing the following ingredients: a vinyl monomer, a polymerization initiator, and a suitable molecular weight controlling agent selected from the group consisting of diethylene-disulfide, dibutyl-disulfide, dicyclohexyl-disulfide, t-dodecyl-mercaptan, n-dodecyl-mercaptan, thioglycol-acid ester, methyl ethyleneglycol, butyl ethyleneglycol octyl ethyleneglcyol, octo penta-erythritol penta-erythritol tetra-mercapto acid ester, and methylene glycol thio acid ester, and mixing and heating this mixture at a temperature above room temperature for at least 15 minutes, thereafter cooling the mixture to room temperature;

(b) adding to the cooled mixture a blowing agent;

(c) dividing the mixture, including the blowing agent, into two parts and to the first part incorporating therein a suitable amount of catalyst, and to the second part incorporating therein a suitable amount of a polymerization initiator; and (d) mixing the two parts together to enable the two parts to polymerize to produce a polymerized product.

15. A process as defined in claim 14 wherein the vinyl monomers are selected from the group consisting of: methyl methacrylate, n-butylmethacrylate, n-hexylmethacrylate, n-butylacrylate, 2-ethylhexylacrylate, 2-ethylhexylmethacrylate, vinyl acetate, vinyl chloride, ethyleneglycol-dimethacrylate, triethyleneglycol-dimethacrylate, and trimethylolpropane trimethacrylate.

16. A process as defined in claim 14 wherein the blowing agent is selected from the gorup consisting of: trichlorofluoromethane, trichlorotrifluoroethane, trichlorofluoroethane, pentane, trichlororofluoromethane combined with diocytylphthalate, trichlorofluoromethane combined with dibutylphthalate and trichlorofluoromethane combined with dimethylphthalate.

17. A process as defined in claim 14 wherein the polymerization initiator is selected from the group consisting of: a zinc, cadmium, cobalt, copper or iron substituted organic substance.

18. A process as defined in claim 14 wherein the polymerization initiator is selected from the group consisting of: zinc thioglycol, cadmium thioglycol, copper naphthenate, iron naphthenate and cobalt naphthenate.

19. A process as defined in claim 14 wherein the catalyst is selected from the group consisting of: lauryl peroxide, benzoyl peroxide, hydroperoxide, alkylperoxide, dibenzoyl peroxide, dilauryl peroxide, t-butyl peroctoate, perbenzoate, perpivalate, permaleinate azobis-isobutyl acetate, azo-bis-isobutyl nitrile, butyl permalmate peroxide, t-butyl hydroperoxide modified with maleic anydride, alkyd sulfhydride ester, methyl ethylene glycol thio acid ester, ethylene glycol thio acid ester and butyleneglycol thio acid ester, dimethyl para toluidene, di-isopropanol para toluidene and dioxy ethyl paratoluidene.

20. A process according to claim 15 wherein the vinyl monomer is methylmethacrylate.

21. A process according to claim 20 wherein the molecular weight controlling agent is methylene glycol thio acid ester.

22. A process according to claim 21 wherein the blowing agent is trichlorofluoromethane.

23. A process according to claim 22 wherein the polymerization initiator is zinc thioglycol.

24. A process according to claim 14 wherein the acrylate resin comprises a mixture of methylmethacrylate and n-hexylmethacrylate.

25. A process according to claim 23 wherein the catalyst is lauryl peroxide

26. A process according to claim 14 wherein the product is subsequently heated to a temperature of above at least about 120° C. for sufficient time to provide a foamed product.

27. A process according to claim 1 or 14 wherein a filler selected from the group consisting of silicate, carbonate, talc, quartz, ground glass and aluminum trihydrate is added before polymerization.

28. A process according to claim 1 or 14 wherein a flame retardant from the group consisting of poly penta bromo benzyl acrlate, antimony dioxide and aluminum trihydrate is added before polymerization.

29. The process of claim 1 further comprising the step of incorporating glass fibers into the monomer before polymerization.

30. The process of claim 2 further comprising the step of incorporating glass fibers into the monomer before polymerization.

31. The process of claim 3 further comprising the step of incorporating glass fibers into the monomer before polymerization.

32. The process of claim 14 further comprising the step of incorporating glass fibers into the monomer before polymerization.

33. The process of claim 15 further comprising the step of incorporating glass fibers into the monomer before polymerization.

34. The process of claim 16 further comprising the step of incorporating glass fibers into the monomer before polymerization.

* * * * *

UNITED STATES PATENT AND TRADEMARK OFFICE
CERTIFICATE OF CORRECTION

PATENT NO. : 4,816,492

DATED : March 28, 1989

INVENTOR(S) : Rolf M. Schiller; Jost H. Schiller

It is certified that error appears in the above-identified patent and that said Letters Patent is hereby corrected as shown below:

In claim 1, column 13, line 66, following "acetate, a", insert --vinyl--.

In claim 1, column 13, line 68, delete "elected", and substitute therefor --selected--.

In claim 16, column 15, line 22, delete "gorup", and substitute therefor --group--.

In claim 16, column 15, line 24, delete "trichlororofluoromethane", and substitute therefor --trichlorofluoromethane--.

In claim 28, column 16, line 27, delete "acrlate", and substitute therefor --acrylate--.

Signed and Sealed this

Tenth Day of October, 1989

Attest:

DONALD J. QUIGG

Attesting Officer

Commissioner of Patents and Trademarks